(12) United States Patent
Janning

(10) Patent No.: US 8,654,549 B2
(45) Date of Patent: Feb. 18, 2014

(54) BATTERY POLARITY CONTROL SYSTEM

(75) Inventor: John L. Janning, Bellbrook, OH (US)

(73) Assignee: JLJ, Inc., Bellbrook, OH (US)

( * ) Notice: Subject to any disclaimer, the term of this patent is extended or adjusted under 35 U.S.C. 154(b) by 57 days.

(21) Appl. No.: 13/447,954

(22) Filed: Apr. 16, 2012

(65) Prior Publication Data

US 2012/0326776 A1   Dec. 27, 2012

Related U.S. Application Data

(60) Provisional application No. 61/501,201, filed on Jun. 25, 2011.

(51) Int. Cl.
*H02M 7/02* (2006.01)
(52) U.S. Cl.
USPC .............. 363/63; 320/116; 320/165; 363/65; 363/68
(58) Field of Classification Search
USPC ........................................................ 320/116
See application file for complete search history.

(56) References Cited

U.S. PATENT DOCUMENTS

| | | | |
|---|---|---|---|
| 4,278,985 A | 7/1981 | Stobbs | |
| 5,427,561 A * | 6/1995 | Eichhorn et al. | 446/463 |
| 5,621,299 A * | 4/1997 | Krall | 320/103 |
| 5,623,550 A * | 4/1997 | Killion | 381/322 |
| 6,023,418 A * | 2/2000 | Engira | 363/63 |
| 6,429,624 B2 * | 8/2002 | Fujisawa | 320/134 |
| 8,054,049 B1 * | 11/2011 | Michaelis | 320/165 |
| 2009/0190276 A1 | 7/2009 | Randall | |
| 2012/0299533 A1 * | 11/2012 | Huffman et al. | 320/107 |

FOREIGN PATENT DOCUMENTS

EP    1571878 A1    9/2005

* cited by examiner

*Primary Examiner* — Edward Tso
*Assistant Examiner* — Johali Torres Ruiz
(74) *Attorney, Agent, or Firm* — Dykema Gossett PLLC

(57) ABSTRACT

An input power circuit for a battery-powered device, such as a toy or consumer electronic device, includes a polarity correction circuit portion. The device includes a first input terminal and a second input terminal, a first output terminal and a second output terminal, and a diode with a forward voltage drop of about 0.5 volts or less. In embodiments, the polarity correction circuit portion is configured to provide a positive voltage polarity at the first output terminal and a negative voltage polarity at the second output terminal for any polarity of power at the first input terminal and the second input terminal. The polarity correction circuit portion can include a diode bridge, and the diode may include a Schottky diode or a germanium diode.

12 Claims, 2 Drawing Sheets

BATTERY POLARITY CONTROL SYSTEM

CROSS-REFERENCE TO RELATED APPLICATION

This application claims priority to U.S. provisional patent application No. 61/501,201, filed Jun. 25, 2011, hereby incorporated by reference in its entirety.

BACKGROUND

1. Technical Field

The present disclosure relates to power input in electronic devices, including battery-powered toys, consumer electronics, and other types of low-power devices.

2. Description of the Related Art

Conventional devices that rely on power from a battery, such as toys, consumer electronic devices (e.g., radios, clocks, and remotes), automobiles, and the like, typically require the insertion of one or more batteries in a particular orientation. If a device receives a battery (i.e., cell) in an orientation not contemplated by the design of the device, the polarity of the input power may be incorrect and the device may not function. For some devices, the consequences of inserting a battery in the wrong orientation are the time and inconvenience of removing and replacing the battery in the proper orientation. For other devices, such as automobiles, inserting or connecting a battery with the incorrect designated polarity could harm the device and/or user.

The present disclosure seeks to address one or more of the above-identified challenges.

SUMMARY

The present disclosure teaches various embodiments of circuits, such as input circuits, that address one or more challenges associated with the prior art by allowing batteries to be safely and operatively installed in electronic devices such as toys, consumer electronic devices, automobiles, etc., in either polarity direction (i.e., in either orientation). One such embodiment of an input power circuit for a toy or low-power electronic device can include a polarity correction circuit portion comprising a first input terminal and a second input terminal, a first output terminal and a second output terminal, and a diode with a forward voltage drop of about 0.5 volts or less. The polarity correction circuit portion may be configured to provide positive voltage polarity at the first output terminal and a negative voltage polarity at the second output terminal for any polarity of power at the first input terminal and the second input terminal. In an embodiment, the diode can be a Schottky diode. In another embodiment, the diode can be a germanium diode. In an embodiment, the polarity correction circuit portion can comprise a diode bridge.

For example, and without limitation, an embodiment of a toy that may address one or more aforementioned challenges can comprise a battery port configured to receive input power from two or more batteries and two or more diode bridges. Each of the two or more diode bridges may include two input terminals configured to be coupled to a respective one of the two or more batteries, two output terminals, and a diode with a forward voltage drop of about 0.5 volts or less. The two or more diode bridges can be configured to provide output power of a particular output polarity for any polarity of input power from the two or more batteries.

An embodiment of an input power circuit for an electronic device can include two or more polarity correction circuit portions. Each of the polarity correction circuit portions can include a first input terminal configured to receive input power of a first input polarity and a second input terminal configured to receive input power of a second input polarity, wherein the first input polarity and the second input polarity are different. Each of the polarity correction circuit portions can also include a diode with a forward voltage drop of about 0.5 volts or less, and a switch configured to open and close the polarity correction circuit portion. The input power circuit can further include a first output terminal providing power of a positive output polarity and a second output terminal providing power of a negative output polarity.

Additional disclosures are provided and illustrated in the following sections and Figures.

BRIEF DESCRIPTION OF THE DRAWINGS

Embodiments of the invention will now be described, by way of example, with reference to the accompanying drawings, wherein.

DETAILED DESCRIPTION

Reference will now be made in detail with respect to embodiments of the present disclosure, examples of which are described herein and illustrated in the accompanying drawings. While concepts will be described in conjunction with embodiments, it will be understood that the invention is not intended to limit the specific disclosures associated with the embodiments. On the contrary, the invention is intended to cover alternatives, modifications and equivalents, which may be included within the spirit and scope of the invention as defined by the appended claims.

Figure 1:
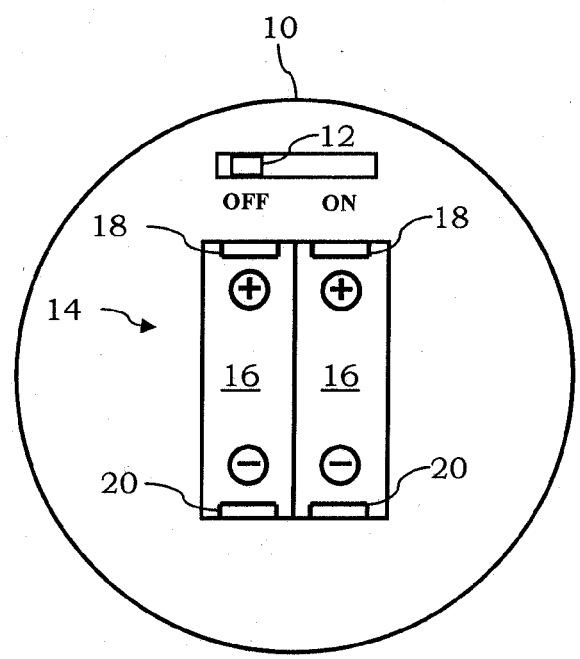
FIG. 1 is a diagrammatic view of an electronic device with a battery port.

FIG. 1 is a diagrammatic view of an electronic device 10 including an ON/OFF switch 12 and a battery port 14. The battery port 14 includes two receptacles 16 for batteries, each receptacle 16 including a first input terminal 18 and a second input terminal 20. As noted, conventional consumer electronic devices generally require a specific polarity orientation for inserted batteries. Thus, each receptacle 16 may include indications of the "proper" orientation for inserting a battery, as indicated by the plus and minus symbols in FIG. 1. The present disclosure, among other things, teaches how to supply power to the electronic device 10 even if batteries are inserted in an orientation other than as marked in the receptacles 16—i.e., if the batteries are inserted in the incorrect/non-designated polarity.

The electronic device 10 can be or can include a number of different electronic devices. For example only, the electronic device 10 can be a small consumer electronic device, such as a toy, radio, clock, or remote, an automobile, or any other device configured to use one or more batteries for power. A "toy" can include, but is not limited to, action figures, small musical instruments, small remote-controlled devices, such as cars and trucks, and small plush devices capable of battery-powered movement. Of course, numerous other types and examples of toys are known and contemplated by this disclosure. Additionally or alternatively, the electronic device 10 can be or can include a low-power electronic device, where "low-power electronic device" can include, for example only, a device configured to receive power from one or more batteries providing about 1.5 volts each. Accordingly, the present disclosure is not limited to a particular type of electronic device 10.

As generally illustrated, a power switch 12 can be provided for opening and closing one or more circuits. As generally described in conjunction with FIGS. 3A and 3B, the power switch 12 may be coupled to an input power circuit.

The battery port 14 and the receptacles 16 can be configured to receive batteries of almost any size, shape, and voltage, depending on the needs of the electronic device 10. For example only, the receptacles 16 can be configured to receive consumer batteries, each providing power at about 1.5 volts, such as AAA, AA, C, or D batteries. It should be understood that "about 1.5 volts" may include similar consumer battery voltages, such as, for example only, 1.25 volts and 1.65 volts. In an embodiment, a plurality of receptacles 16 can be configured in series with each receptacle in the series being associated with a diode bridge.

Figure 2:
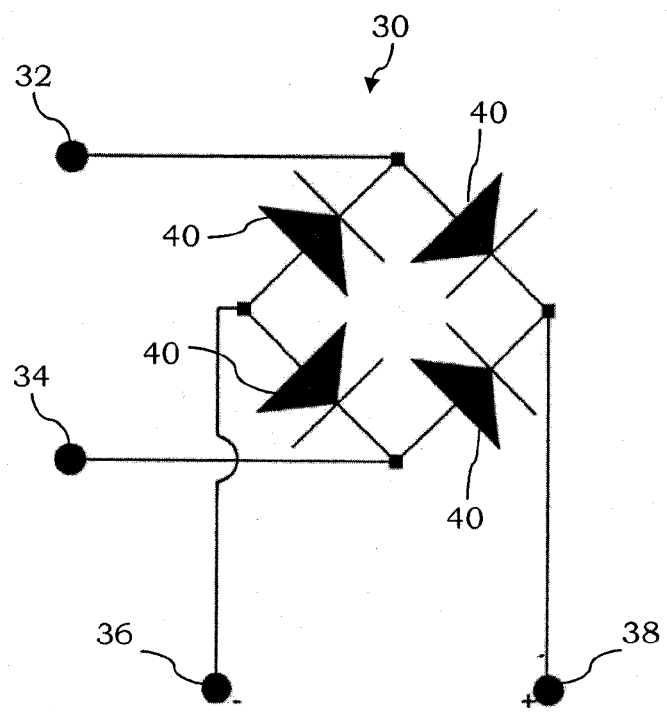
FIG. 2 is a schematic view of a polarity correction circuit portion.
Figure 3A:
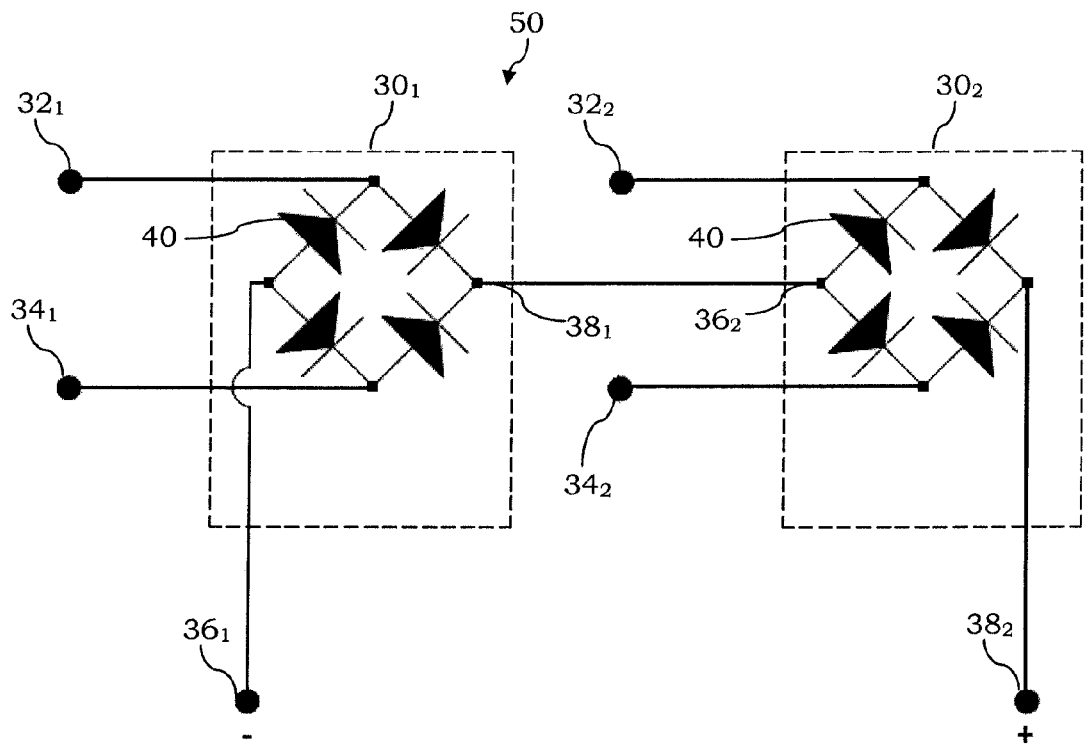
FIG. 3A is a schematic view of an embodiment of a circuit with multiple polarity correction circuit portions for multiple batteries.
Figure 3B:
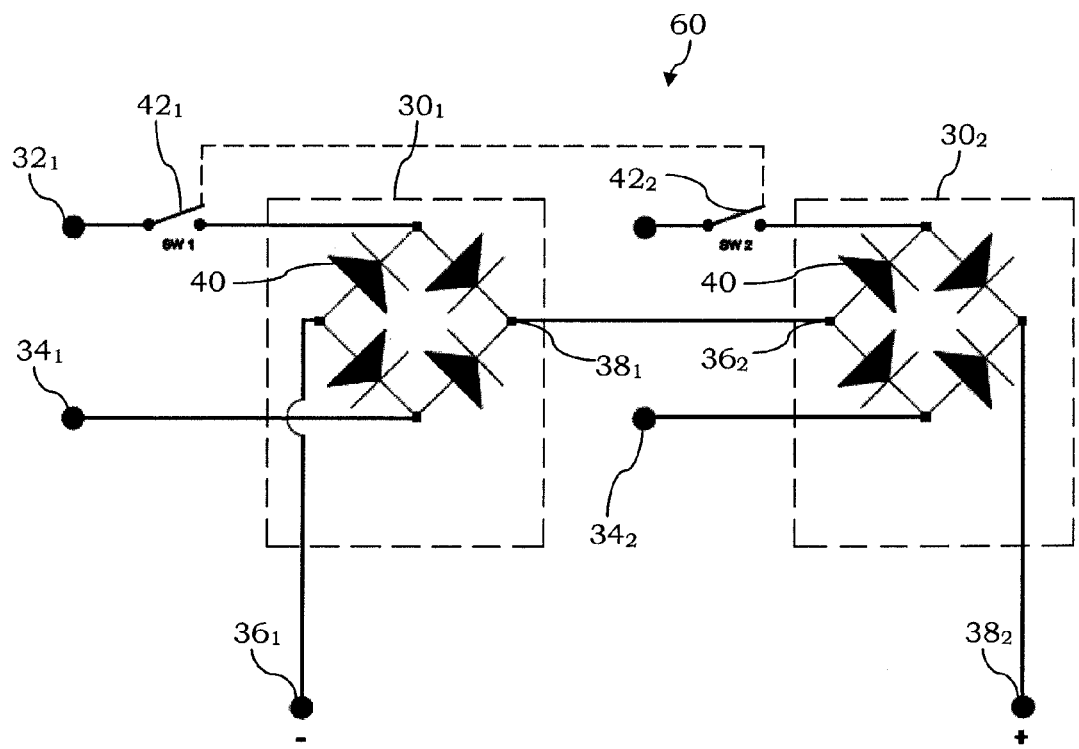
FIG. 3B is a schematic view of an embodiment of a circuit with multiple separately-switched polarity correction circuit portions for multiple batteries.

Conventional devices generally require that batteries are inserted in a designated orientation for the device to function. With reference to FIG. 1, an electronic device 10 may require inserting one or more batteries in one or more battery-receiving receptacles (e.g., 16) with the positive polarity terminal of the battery intended to contact one terminal contact (e.g., 18) and the negative polarity terminal intended to contact an opposing terminal contact (e.g., 20). For example, and without limitation, if the configuration illustrated in FIG. 1 represents a conventional device, inserting one or both batteries into the illustrated receptacles 16 in the reverse orientation would commonly not permit the device 10 to properly function. FIGS. 2, 3A, and 3B generally illustrate embodiments of an input circuit that in essence can "correct" (or render inconsequential) the polarity of a battery in a receptacle 16.

FIG. 2 is a schematic depiction of an embodiment of a diode bridge circuit 30 including two input terminals 32, 34, two output terminals 36, 38, and four diodes 40. A diode bridge of the configuration shown can provide output power at the output terminals 36, 38 of a consistent polarity irrespective of the polarity of input power at the input terminals 32, 34. Regardless of input polarity, output terminal 36 will always be negative and output terminal 38 will always be positive. That is, current will flow in the same direction between the output terminals 36, 38 regardless of the direction of current flow between the input terminals 32, 34.

Each diode 40 can be a known type of diode, such as, for example only, a p-n junction diode or a metal-semiconductor diode, also known as a Schottky diode. In an embodiment, one or more of the diodes 40 can be a p-n junction diode in which the semiconductor is germanium. In certain embodiments, a Schottky diode may be preferred because of its forward voltage drop of about 0.5 volts or less. In other embodiments, a germanium diode may be preferred because of its forward voltage drop of about 0.3 volts or less. The forward voltage drop of each diode 40 can be particularly significant when the electronic device in which the diode bridge 30 is used is configured to receive consumer batteries that supply power at about 1.5 volts. Because the input voltage drops over two diodes in the bridge between input and output, a forward voltage drop that is too high for an individual diode (e.g., 0.7 or 0.8 volts) could result in no power for the device itself.

The input terminals 32, 34 can be electrically coupled to the exterior terminals of a battery port, such as one set of the terminals 18, 20 shown in FIG. 1, and the output terminals 36, 38 can be electrically coupled to the electronic device to supply power. As a result, the diode bridge 30 can act as a polarity correction circuit portion for a battery inserted into the electronic device 10. Thus, even if a battery is inserted into a receptacle 16 in either orientation, the power supplied at the output terminals 36, 38 will have the proper polarity.

FIGS. 3A and 3B are schematic views of embodiments 50, 60 of a circuit with multiple polarity correction circuit portions for multiple batteries. The circuits 50, 60 are similar except for the switching mechanisms employed. The circuit 50 illustrated in FIG. 3A includes a common switch for both polarity correction circuit portions, whereas the circuit 60 illustrated in FIG. 3B includes separate switches for each polarity correction circuit portion.

Both illustrated circuits 50, 60 include a first diode bridge $30_1$ and a second diode bridge $30_2$, each of which may function as a polarity correction circuit portion for a separate battery. Each diode bridge 30 includes first and second input terminals 32, 34, first and second output terminals 36, 38, and four diodes 40. The first and second diode bridges $30_1$, $30_2$ are connected in series, with the positive polarity output terminal $38_1$ from the first diode bridge $30_1$ electrically coupled with the negative polarity output terminal $36_2$ from the second diode bridge $30_2$. Each diode bridge 30 can function substantially as described in conjunction with FIG. 2 except where indicated otherwise in conjunction with FIGS. 3A and 3B. As generally illustrated, the first output terminal 36 of the first diode bridge $30_1$ may have a negative polarity, and the second output terminal 38 of the second diode bridge $30_2$ may have a positive polarity, regardless of input polarity.

The circuit 60 in FIG. 3B also includes a switch 42 for each diode bridge 30. The switches $42_1$, $42_2$ separately control input power for the illustrated diode bridges $30_1$, $30_2$. Although a single switch 42 could be configured to effectively cut off power to the entire circuit 60, for some applications involving multiple batteries separate switches $42_1$, $42_2$ may be desirable to help ensure that neither (i.e., no individual) diode bridge 30 will drain a battery to which it is electrically coupled via bridge leakage current.

The circuit 50 in FIG. 3A may also be provided with a switch for opening and closing the circuit 50. The switch may be electrically coupled to the input terminals 32, 34 to control the provision of power from batteries to the electronic device through the circuit 50.

In an embodiment, one of the circuits 50, 60 may be an input power circuit for an electronic device, such as the electronic device 10 shown in FIG. 1. For example, the terminals 18 in the receptacles 16 can be respectively electrically coupled to the input terminals 32 in the diode bridges $30_1$, $30_2$. Similarly, the terminals 20 can be respectively electrically coupled to the input terminals 34. Thus, when batteries are placed in the receptacles 16, one battery may be electrically coupled to the first diode bridge $30_1$, and a second battery may be electrically coupled to the second diode bridge $30_2$. Either battery can be inserted in either orientation, and the input power circuit 50, 60 can provide power of the proper polarity for the electronic device 10.

Referring to FIGS. 1 and 3B, the input power circuit 60 may be incorporated in the electronic device 10. A user of the electronic device 10 can insert respective batteries into the receptacles 16 in various orientations. The user can turn the device 10 on by moving the power switch 12 to the ON position. The power switch 12 can close both switches $42_1$, $42_2$ to provide power at the output terminals $36_1$, $38_2$. The user could turn the device 10 off by moving the power switch 12 to the OFF position. The power switch 12 could open both switches $42_1$, $42_2$ to cut off power to both diode bridges $30_1$, $30_2$ so that neither battery is drained by bridge leakage current. By including the input power circuit 60 in the electronic device 10, the device 10 can be configured to advantageously function irrespective of the polarity orientation in which a user inserts batteries.

The drawings are intended to illustrate various concepts associated with the disclosure and are not intended to limit the claims. A wide range of changes and modifications to the embodiments described above will be apparent to those skilled in the art, and are contemplated. For example, more than two polarity correction circuit portions can be used for a device with more than two batteries. It is therefore intended that the foregoing detailed description be regarded as illustrative rather than limiting, and that it be understood that the following claims, including all equivalents, are intended to define the spirit and scope of this invention.

What is claimed:

1. A toy comprising:
    a battery port configured to receive input power from two or more batteries;
    two or more diode bridges, each comprising two input terminals configured to be coupled to a respective one of the two or more batteries and a diode with a forward voltage drop of about 0.5 volts or less,
    wherein the two or more diode bridges are connected in series to provide output power of a particular output polarity for any polarity of input power from the two or more batteries.

2. The toy of claim 1, wherein at least one of the two or more diode bridges comprises a diode with a forward voltage drop of about 0.3 volts or less.

3. The toy of claim 1, wherein at least one of the two or more diode bridges comprises at least one of a Schottky diode and a germanium diode.

4. The toy of claim 1, wherein an output terminal of a first of the two or more diode bridges is electrically coupled to an output terminal of a second of the two or more diode bridges.

5. The toy of claim 1, wherein each of the two or more diode bridges is separately-switched.

6. The toy of claim 5, further comprising a power switch electrically coupled to respective switches for each of the two or more diode bridges.

7. An input power circuit for an electronic device, comprising:
    two or more polarity correction circuit portions, each comprising:
        a first input terminal configured to receive input power of a first input polarity and a second input terminal configured to receive input power of a second input polarity, wherein the first input polarity and the second input polarity are different;
        a diode with a forward voltage drop of about 0.5 volts or less; and
        a switch configured to open and close the polarity correction circuit portion,
    wherein the two or more polarity correction circuit portions are connected in series so as to provide a single output of a particular polarity regardless of the input polarity at any of the two or more polarity correction circuit portions.

8. The input power circuit of claim 7, wherein the switch in a first of the two or more polarity correction circuit portions is different than the switch for a second of the two or more polarity correction circuit portions.

9. The input power circuit of claim 7, wherein the diode in at least one of the polarity correction circuit portions comprises one of a Schottky diode and a germanium diode.

10. The input power circuit of claim 9, wherein at least one of the polarity correction circuit portions comprises a diode bridge.

11. The power circuit of claim 10, wherein the diode bridge comprises one of four Schottky diodes and four germanium diodes.

12. The power circuit of claim 7, wherein the diode has a forward voltage drop of about 0.3 volts or less.

* * * * *